United States Patent
Buer et al.

(10) Patent No.: US 9,224,013 B2
(45) Date of Patent: Dec. 29, 2015

(54) SECURE PROCESSING SUB-SYSTEM THAT IS HARDWARE ISOLATED FROM A PERIPHERAL PROCESSING SUB-SYSTEM

(71) Applicant: Broadcom Corporation, Irvine, CA (US)

(72) Inventors: Mark Buer, Payson, AZ (US); Theodore Trost, San Diego, CA (US); Jacob Mendel, Kibutz Givat Brenner (IL)

(73) Assignee: BROADCOM CORPORATION, Irvine, CA (US)

( * ) Notice: Subject to any disclaimer, the term of this patent is extended or adjusted under 35 U.S.C. 154(b) by 80 days.

(21) Appl. No.: 13/728,875

(22) Filed: Dec. 27, 2012

(65) Prior Publication Data

US 2014/0156872 A1    Jun. 5, 2014

Related U.S. Application Data

(60) Provisional application No. 61/733,863, filed on Dec. 5, 2012.

(51) Int. Cl.
*G06F 3/00* (2006.01)
*G06F 13/12* (2006.01)
*G06F 13/00* (2006.01)
*G06F 21/76* (2013.01)

(52) U.S. Cl.
CPC ............................ *G06F 21/76* (2013.01)

(58) Field of Classification Search
None
See application file for complete search history.

(56) References Cited

U.S. PATENT DOCUMENTS

2011/0078081 A1* 3/2011 Pirzadeh et al. ............... 705/44
2012/0117369 A1* 5/2012 Gehrmann ...................... 713/2
2012/0178366 A1* 7/2012 Levy et al. ................... 455/41.1

FOREIGN PATENT DOCUMENTS

WO    WO 2011/068448    * 6/2011 ................ 726/30

* cited by examiner

*Primary Examiner* — Idriss N Alrobaye
*Assistant Examiner* — David Martinez
(74) *Attorney, Agent, or Firm* — Sterne, Kessler, Goldstein & Fox P.L.L.C.

(57) ABSTRACT

Systems and methods are provided that allow a secure processing system (SPS) to be implemented as a hard macro, thereby isolating the SPS from a peripheral processing system (PPS). The SPS and the PPS, combination, may form a secure element that can be used in conjunction with a host device and a connectivity device to allow the host device to engage in secure transactions, such as mobile payment over a near field communications (NFC) connection. As a result of the SPS being implemented as a hard macro isolated from the PPS, the SPS may be certified once, and re-used in other host devices without necessitating re-certification.

20 Claims, 3 Drawing Sheets

SECURE PROCESSING SUB-SYSTEM THAT IS HARDWARE ISOLATED FROM A PERIPHERAL PROCESSING SUB-SYSTEM

TECHNICAL FIELD

The technical field of the present disclosure relates to secure element certification for mobile payment applications, and in particular, to partitioning a secure element into a hard macro that can be certified and re-used in multiple devices.

BACKGROUND

Mobile wireless communication devices such as cellular telephones, two-way radios, personal digital assistants (PDAs), personal computers (PCs), tablet computers, laptop computers, home entertainment equipment, radio frequency (RF) identification (RFID) readers, RFID tags, etc. have evolved from large devices focused on a single application or use, such as analog voice communications, to comparatively smaller devices that are capable of and used for many different things such as digital voice communications and digital data communications, e.g., Short Message Service (SMS) for text messaging, email, packet switching for access to the Internet, gaming, Bluetooth®, Multimedia Messaging Service (MMS) and secure transaction capability to provide some examples. In addition to these capabilities, the mobile wireless communication devices of today have additional non-communication related capabilities, such audio and/or video recording to provide an example, and software applications, such as, e.g., a calendar and a phone book.

Near Field Communication (NFC) is one technology being implemented in mobile devices for many present and anticipated applications. NFC can be accomplished by touching or placing two NFC enabled devices in close proximity to each other. NFC can be used for, among other things, contactless transactions, data exchange, and/or setup and mobile provisioning. For example, contactless payment systems can be configured to implement NFC for mobile payment by storing credit card and/or loyalty program information within a virtual wallet in an NFC enabled device which can be touched to or placed in close proximity with an NFC terminal that accepts the credit card and/or loyalty program information to complete the mobile payment transaction.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
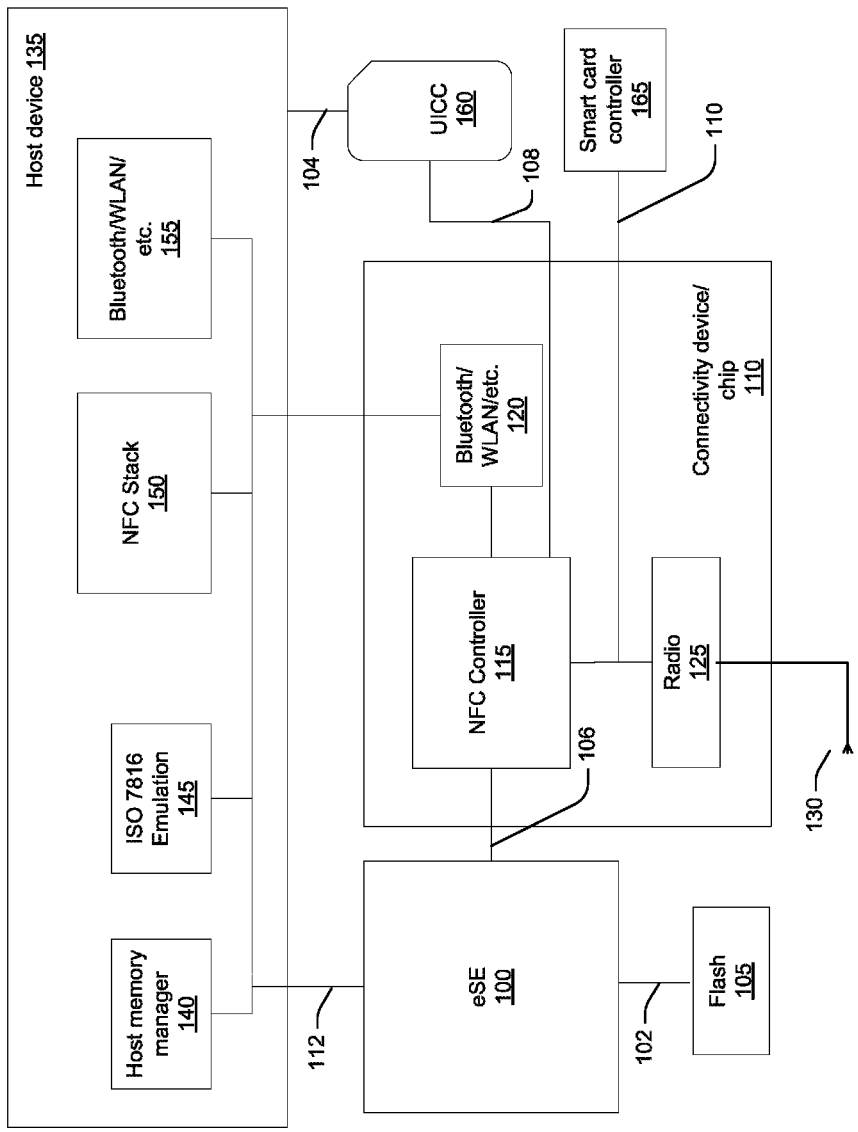
FIG. 1 illustrates an example connection diagram representative of an embedded secure element operating in conjunction with a connectivity device and a host device in accordance with various embodiments.

As previously alluded to, NFC technology may be utilized to implement mobile payment. Mobile payment applications may require storage and execution thereof by a secure element (SE) in combination with an NFC or other connectivity controller. That is, an SE may be configured to securely store mobile payment applications and/or information, such as payment information, authentication information, etc., and provide an environment for secure execution of these mobile payment applications. The SE in a mobile device, for example, may be implemented in various forms, e.g., as a subscriber identity module (SIM), as an SE integrated into a memory card, such as a Secure Digital (SD™) card, or as an embedded SE (eSE).

Regardless of the manner in which an SE is implemented in a mobile device, certification of the SE as a smart card may be required. For example, Europay, MasterCard, and Visa (EMV®) and Common Criteria for Information Technology Security Evaluation (also known as Common Criteria or CC) are international standards that may be used as guides for the development, evaluation, and/or procurement of devices with security functionality. As a result of such evaluation through, the CC, for example, certification of a device, such as a mobile device, may be obtained, where certain criteria may be used to evaluate the security of the mobile device The criteria that may be used to evaluate the security of the design of, e.g., a secure processing system or sub-system (SPS) of an SE (referred to as the target of evaluation (TOE)) can include the following: attack potential (which may define the types of attacks used against a smart card); attack phases (analysis to determine the identification and exploitation phases of an attack); scoring factors including, e.g., elapsed time, required expertise of an attacker, knowledge of TOE design, access to TOE design, equipment needed to attack, and the availability of samples to an attacker); attack potential calculations; and application of attacks to TOE design. Depending on the level of certification achieved, and in accordance with, e.g., the CC, an Evaluation Assurance Level (EAL) may be assigned, where EAL refers to a numerical rating describing the depth and rigor of an evaluation. High scores in a certification evaluation must be achieved to receive a high EAL of 5+ which may be desirable for certain devices and/or applications utilized having secure/security functionality.

Various embodiments of the present disclosure are directed to an eSE that may utilize an SPS that can be physically partitioned from all other "unsecure" logic and/or circuitry, where the SPS may be implemented in a hard macro. In accordance with various embodiments, an SPS may refer to a processing system or module configured to protect secure information/data, such as critical user data, as well as TOE security functions (TSF) data, which can include security integrated circuit (IC) embedded software executing on a TOE. Additionally, the SPS may be configured to provide a platform on which to load application software that may provide functions to support secure transactions, e.g., financial transactions, with embedded devices. The SPS may be flexibly designed and able to support a variety of different devices that may utilize, e.g., a direct transaction media, such as point of sale terminals, or NFC enabled devices, such as cellular telephones.

As utilized herein, the term "hard macro" may refer to the design of a logic function on an IC chip that may specify how required logic elements are interconnected, as well as the physical pathways and/or wiring patterns between components. In particular, an SPS in accordance with various embodiments may be a die isolated hard macro that can be instantiated in, e.g., an application-specific IC (ASIC). This may be contrasted with a soft macro, where the physical pathways and/or wiring patterns are not specified. The SPS in accordance with various embodiments may, through an isolation bridge protected by the SPS, utilize generic interfaces to access and/or otherwise interact with such unsecure/peripheral logic and/or circuitry, which may make up or embody a peripheral processing system (PPS). That is, an eSE configured in accordance with various embodiments may be partitioned into a first portion that may include a hard macro SPS, and a second portion that may include a PPS, where the hard macro SPS may be "self-sufficient" within the boundary of the hard macro and isolated from the PPS. In accordance with various embodiments, the PPS may refer to a processing system utilized to relay communication on physical transport interfaces (as will be described in greater detail below) to the isolation bridge. Accordingly as well, the hard macro SPS in accordance with various embodiments may be "transport-agnostic."

In accordance with various embodiments, and as a result of utilizing a hard macro SPS, the hard macro SPS may be certified, as previously described, and used/re-used in one or more devices without the need to re-certify those one or more devices in their entirety. That is, and for example, a common security requirement may be that only certified (or trusted) code be executed in the security domain of a system (e.g., an SPS). In certain approaches to meeting this security requirement, systems may implement an architecture where a hardware mechanism is used to allow a single processor to operate logically as two processors. However, from a security perspective, this architecture may require preventing the SPS from operating simultaneously with an application processor.

Furthermore, and in the context of multi-application environments, secure (certified) applications (such as a certified financial application) may co-exist with customer-written applets. Thus, certification of a device in which such multi-application environments exist may become invalid once the customer-written (untrusted) applet is added to the multi-application environment. Therefore, utilization of a hard macro SPS in accordance with various embodiments may avoid the need to, e.g., re-certify an entire device upon an untrusted applet being added to the multi-application environment.

Additionally, any updates to interface drivers and/or system interfaces, for example, need not affect the certification of the hard macro SPS, nor would they pose any type of security risk. For example, certification of a device utilizing a conventional SPS, may entail certification of the entire device including any interfaces, such as one or more peripheral interfaces, when the device may be a small IC chip. Because any differences in such (small IC chip) devices may simply involve differences in flash memory, electrically erasable programmable read only memory (EEPROM), and/or software running on a platform of the devices, including these aspects of the devices as part of a TOE for certification may be thought of as being straightforward. Although re-certifying each of the devices may be both a costly and lengthy process, where any new security threats may also require evaluation, in the context of, e.g., generational changes to smart card devices, re-certification of entire devices may not pose issues. However, and in the context of combination/multi-mode devices, such as communication devices that enable some combination of wireless local area network (WLAN), Bluetooth®, Global Navigation Satellite System (GNSS), e.g., Global Positioning System (GPS), and cellular communications utilizing, e.g., Generation Partnership Project (3GPP) Long Term Evolution (LTE) communications standard, a fourth generation (4G) mobile communications standard, or a third generation (3G) mobile communications standard, for example, re-certification may be unfeasible or at least, difficult to achieve.

Various embodiments described herein are presented in the context of an eSE designed for use in a host device, such as a mobile handset, in combination with an NFC controller and/or another connectivity controller(s). The NFC and/or other connectivity controllers may be included in/implemented as a connectivity device/chip. Such connectivity devices/chips may provide, e.g., NFC capabilities, Bluetooth® communication, Wi-Fi™ communication, etc., or any combination thereof. Various embodiments may also provide security applications that may be specific to a host device that may not necessarily utilize NFC. It should be noted that an eSE in accordance with various embodiments may be implemented in any present or anticipated host device that may benefit from integration with the eSE without the need for re-certification when executing/implementing secure applications/functions.

The eSE design may utilize external flash memory to provide near unlimited secure application storage within a mobile handset. Non-volatile data may be stored in either host processor flash memory or local serial peripheral interface (SPI) flash memory, where the local SPI flash memory may be used for applications that are to be available when a host, e.g., the mobile handset, is not powered on. One example of such an application may be a field power application. Additionally, the local SPI flash memory may be utilized for the storage of static information outside of the TOE in external non-volatile memory.

The external flash memory may always be protected by unique keys stored in the eSE to ensure that the security of the applications and data is maintained at the same level as on-chip information. The external flash memory may be managed by the eSE firmware and host device software to ensure a seamless integration with host device-based applications. By providing flash memory externally, the eSE provides flexible options that can accommodate secure application storage, as well as the potential for future integration in other host devices.

Designing the SPS of an eSE in accordance with various embodiments may entail completely designing the SPS in a secure facility as a hard macro. For example, once a final chip level design for an SPS as a hard macro is achieved, that final chip level design may be imported into a secure facility. The hard macro SPS may be merged with other components of the eSE, e.g., the PPS. Design Rule Checking (DRC) may be performed on the eSE, and upon DRC validation (with requisite Design Rules), the eSE may be taped out from the secure facility onto a certified chip (e.g., IC) fabrication line/facility for manufacture.

The eSE may utilize a variety of system interfaces to provide external connectivity. A first interface may that which connects the eSE to an NFC or connectivity controller, which provides an interface for secure applications to communicate using a radio interface. For example, the host device (utilizing an eSE in accordance with various embodiments) and an NFC-enabled device may interact via a secure application(s) using NFC. A second interface may connect the eSE with the host device processor. The eSE may connect (either physically or logically) to the host device processor for management, such as, e.g., loading and unloading applications, as well as for interacting with host-specific security applications. A third interface may be relied upon to allow the eSE to access flash storage, where again, the eSE may connect, either physically or logically, to external flash memory to effectuate application code and data storage. It should be noted that other system interfaces may be utilized by the eSE for external connectivity purposes.

FIG. 1 illustrates an example connection diagram representative of an eSE 100 operating in conjunction with a connectivity device/chip 110 and a host device 135, where the host device 135 may be, e.g., a mobile handset, and the connectivity device/chip 110 may provide multi-band connectivity for the host device 135.

As previously described, the eSE 100 may utilize external flash memory, e.g., Universal Integrated Circuit Card (UICC) 160 to store secure applications and/or secure information, and local flash memory, e.g., local flash memory 105 for storing non-volatile data. The eSE 100 may connect to the local flash memory 105 via an SPI interface 102, and may connect to the UICC 160 via a single wire protocol (SWP) or dual wire protocol (DWP) interface 106 to an NFC controller 115, and from the NFC controller 115 to the UJCC 160 using an SWP interface 108. The UICC 160 may be connected to the host device 135 via an ISO 7816 interface 104.

Communications on an SWP interface, such as the SWP interface 106 may be asynchronous to an SPS clock which will be described in greater detail below, may not leak clock data, and may operate up to 1.7 Mbps. A DWP interface may be considered to be the same as a SWP interface at the protocol layer, where digital receive and transmit lines are used to bypass the SWP PHY providing a lower power yet higher performance interface. A DWP interface may operates at speeds of up to 6.8 Mbps, where an unused pin for the DWP interface can be used as a general purpose input/output (GPIO) pin when an SWP interface is used.

Again, the eSE 100 may utilize external non-volatile/flash memory for storing secure applications and information/data. The eSE 100 can be configured to use either host flash memory, local flash memory, or both. The local flash memory may be utilized for situations where the host device 135 is not available (such as the aforementioned field power mode). In one example, local flash memory 105 may be used for storing field (or low power) mode applications and data, e.g., mainly for NFC applications. A host processor/device connection may be used to provide an option to download secure applications and data paged into the eSE 100 from a host device processor. It should be noted that the various flash memory may be protected using keys that are unique to each individual eSE, such as eSE 100, where a secure state is encrypted, authenticated and replay protected by the eSE.

The connectivity device/chip 110 may include the aforementioned NFC controller 115 to which the eSE 100 connects via the SWP/DWP interface 106. In turn, the NFC controller 115 may be connected to a radio 125 and an antenna 130 to effectuate NFC (or other radio communication connectivity). Additional elements in the connectivity device/chip 110 may include other connectivity controllers, such as connectivity controller 120 which may provide Bluetooth® connectivity, WLAN (e.g., Wi-Fi™) connectivity, etc. The NFC controller 115, the connectivity controller 120, and the radio 125 may communicate via one or more communications interfaces that may be, e.g., wired or wireless, and the interconnections therebetween may form, e.g., parallel or serial interfaces to carry such communications. It should be noted that for ease of reference, other elements of the connectivity device/chip 110 have been omitted, and that more or less elements in the connectivity device/chip 110 may be implemented without departing from the spirit or the scope of the present disclosure.

Specifically with regard to the SWP/DWP interface 106 between the eSE 100 and the NFC controller 115, all communications may occur on an SWP/DWP interface 104, and EEPROM emulation may be supported in this SWP/DWP mode, where the eSE 100 may provide EEPROM emulation for the NFC controller 115 via the SWP/DWP interface 106. The EEPROM emulation may provide up to 8 Kbytes of data read from the local flash memory 105. In an SWP/DWP+Host mode, all host communications may occur on a host device interface, while all radio communication may occur on the SWP/DWP interface. It should be noted that a DWP interface works in the same manner as an SWP interface, using digital signaling at the PHY layer to reduce power and increase performance, as previously described.

Also connected to the connectivity device/chip 110 may be a smart card controller 165, such as a SmartMX™ contact interface controller, an SLE 97 Solid Flash™ smart card microcontroller, etc., via a digital contact less bridge (DCLB) interface/NFC-wired interface (NFC-WI) 110. A DCLB interface may refer to an interface for providing a connection between an eSE and an NFC modem, and an NFC WI interface may refer to a NFC wired interface having 2 signal wires (signal-in and signal-out) for providing a connection between an eSE and an RF interface of an NFC interface. The smart card controller 165 may be utilized to control the UICC 160.

The eSE 100 may provide a plurality of possible physical host device connection options for interfacing with the host device 135. While a physical host device connection may not be required since the eSE 100 can communicate with the host device 135 through the NFC controller 115 or the connectivity controller 120, it may be preferable, in cases where non-NFC security applications are supported, to utilize a physical host connection. The possible host device interfaces 112 that are supported to effectuate such a physical host device connection may include, but are not limited to the following: a universal asynchronous receiver transmitter (UART) interface, in particular, a four wire flow controlled UART capable of speeds up to 6 mbps; an SPI interface, in particular, an SPI slave mode with up to 33 mbps throughput; and an inter-IC (I2C) interface, in particular, a two wire I2C slave connection dedicated for communication with the host device 135 with a throughput of up to 3.4 Mbps. It should be noted that other physical host device connections may be utilized, e.g., a universal serial bus (USB) connection.

A UART interface 255 may utilize the following I/O signals: RX; TX; RTS; and CTS. The UART interface 255 may have adjustable baud rates from 9600 bps to 4.0 Mbps, and may have an automatic baud rate detection capability that returns a baud rate selection. Alternatively, the baud rate may be selected through a vendor-specific UART HCI command. The vendor-specific UART HCI command may be issued during normal UART HCI operation. A default baud rate may be 115.2 kbps, and the eSE 100 side UART interface 255 may operate correctly with the host device 135 side UART interface (not shown) as long as the combined baud rate error of the eSE 100 and the host device 135 is within +/−2%. The UART interface 255 may run on a fixed reference clock, typically 24 MHz, but other reference clock frequencies may be possible.

It should be noted that the UART interface 255 may support various Bluetooth® HCI protocols, as does the eSE 100, since baseband hosts that communicate with both Bluetooth® and SE devices over UART may wish to use common drivers. Additionally, the UART interface 255 can perform XON/XOFF flow control and includes hardware support for the Serial line Input Protocol (SLIP), and can also perform wake-on-activity.

The UART interface 255, when chosen from the possible host device interfaces 112, can be configured to mimic an ISO 7816 interface for the purposes of re-using existing test equipment, where the three signals utilized by an ISO 7816 interface, e.g., CLK, RST, IO, may be configured as inputs to a UART device, in this case, the eSE 100 and/or the host device 135. The CLK input signal may be used to over-ride a baud clock in the recovery circuit of the eSE 100, the RST line may be routed as a interrupt to a processor (e.g., Cortex-M0)

utilized in the PPS 220, and the I/O line may be configured to use a transmit signal as a driver of a data line. It should be noted that because the UART interface 255 is mimicking an ISO 7816 interface, it is not required to be a compliant ISO 7816 interface, and a default baud rate may be used on both sides of the UART interface to avoid CLK modifications. An external resistor may be used to pull up the signal on the 10 line for ISO 7816 communications, and the eSE 100 programmable drive strength may be controlled from the processor of the PPS.

It should be noted that the possible host device interfaces 112 (e.g., UART, SPI and I2C interfaces) may use shared pins that are multiplexed to the host device 135, allowing one of the possible interfaces device 112 to be used at a time. If the host processor/device connection is effectuated via an I2C interface, then the remaining interface pins can be used as GPIO. Selection of one of the possible host device interfaces 112 may be determined based on interface sensing in the eSE 100 when a one time programmable (OTP) memory to be discussed in greater detail below, has not yet been programmed. Alternatively, the OTP memory may be programmed during manufacturing to select a specific host interface of the possible host device interfaces 112, disabling all others.

It should also be noted that while a direct connection may be implemented between the eSE 100 and the NFC controller 115 and/or connectivity controller 120, both the host device interface (e.g., one of the possible host device interfaces 112) and the SPI interface 102 can be emulated logically through the NFC controller 115 to the host device 135. The eSE 100 may be designed with the assumption that there may always be at least, e.g., 512 Kbytes of local flash memory (e.g., local flash memory 105) storage.

Figure 2:
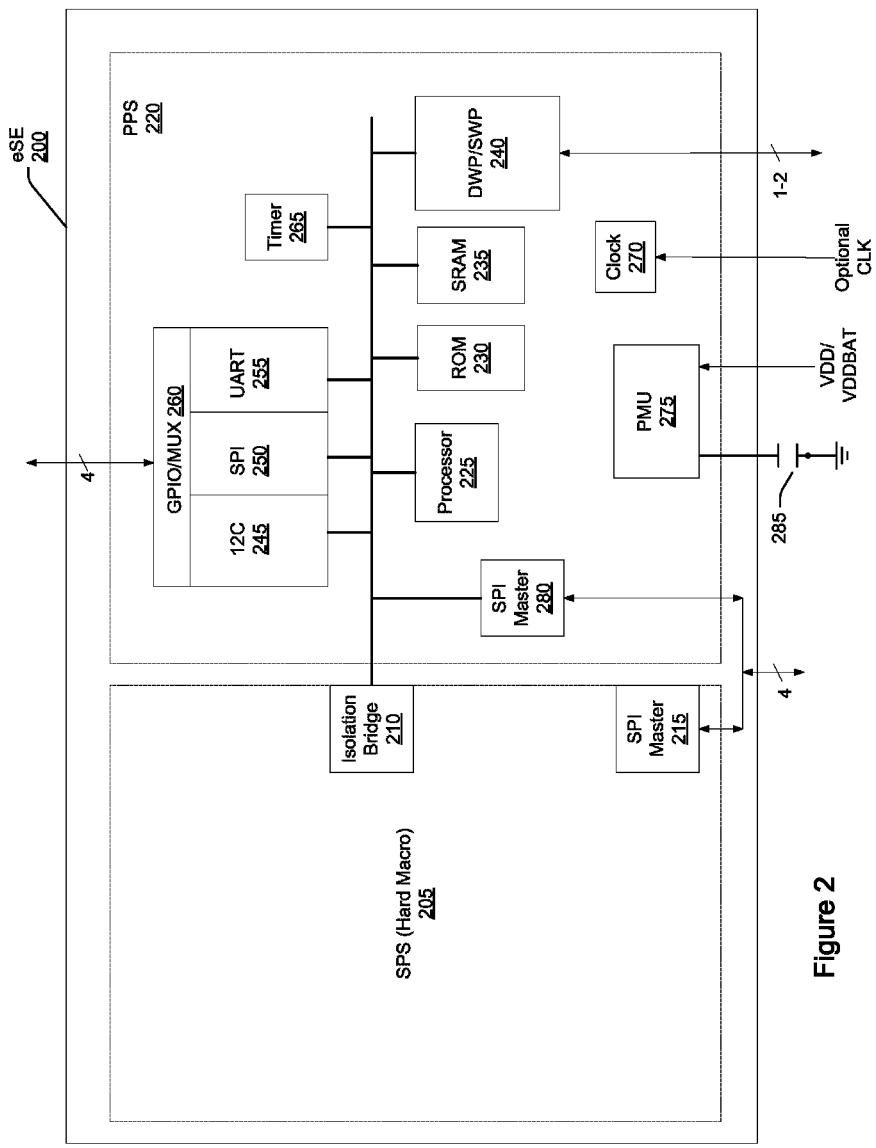
FIG. 2 illustrates an example embedded secure element configured in accordance with various embodiments.

As previously indicated, the eSE 100 may be divided into two portions or subsystems, i.e., a hard macro SPS and a PPS. FIG. 2 illustrates an eSE 200 that can represent an example embodiment of the eSE 100 of FIG. 1, where eSE 200 may include a hard macro SPS 205 and a PPS 220, where the hard macro SPS 205 is hardware isolated from the PPS 220 which may include non-secure or non-security related elements (e.g., memory and periphenols, such as drivers for the aforementioned host device peripheral interfaces). That is, the PPS 220 operates independently from the hard macro SPS 205, thereby allowing the hard macro SPS 205 to maintain its security certification without a need to include any drivers and/or hardware interfaces in the PPS 220 as security critical. As will be described in greater detail below, an isolation bridge 210 may be the only interface for TOE communication between the PPS 220 and the hard macro SPS 205. Additionally, the PPS 220 may mimic an NFC controller, e.g., the NFC controller 115 of FIG. 1, for the hard macro SPS 205, and the hard macro SPS 205 power modes are slaved to the PPS 220 (as well as the NFC controller).

The PPS 220 may utilize a processor 225 (e.g., a Cortex-M0 processor) for execution of interface driver code in a hardware isolated environment, such as the eSE 200. The processor 225 may request secure services from the hard macro SPS 205, and may be responsible for moving data to/from peripheral interfaces from/to an IO shared memory space in static random access memory (SRAM) of the hard macro SPS 205. The processor 225 may have read/write access to an SPI flash memory interface of the hard macro SPS 205 (e.g., SPI master interface 215), via an SPI master interface 280, until it signals the hard macro SPS 205 to exit reset. Once the hard macro SPS 205 is activated, the PPS 220 may lose access to the SPI flash memory interface of the hard macro SPS 205. Furthermore, firmware operating on the processor 225 may ensure that none of the firmware in the hard macro SPS 205 is required to change based on changing external drivers. Accordingly, a separate and isolated patch mechanism for the processor 225 is provided.

A local read only memory (ROM) module 230 may be configured to hold driver code for the processor 225, where the allocated size of this code block may be, e.g., 64 Kbytes. The PPS 220 may contain its own dedicated patch capability for up to, e.g., 16 patches, where patch code may be verified and loaded by the PPS 220 from local flash memory, e.g., the local flash memory 105 of FIG. 1. The PPS 220 may send a request for the hard macro SPS 205 to update the patch locations in the local flash memory 105. The patch code for the PPS 220 may be stored in a section of flash memory dedicated for the PPS 220, where the signature of the patch file is verified by PPS 220 ROM code when the patch is downloaded into the dedicated flash memory for the PPS 220, thereby providing roll back protection with a major and minor revision embedded in the patch file.

The PPS 220 may contain an OTP block (not shown) capable of storing 1 kbits of information. This OTP block may be used for authentication keys, and test debug information for Reliability, Maintainability, and Availability (RMA) analyses.

The PPS 220 may further contain a dedicated 16 Kbyte scratch memory (e.g., SRAM module 235) for the processor 225. The processor 225 may be allowed to execute instructions from this memory, and an isolated I/O buffer (not shown) between the hard macro SPS 205 and the PPS 220 may be used for exchanging commands and data.

In order to communicate between the hard macro SPS 205 and the PPS 220, the hard macro SPS 205 and the PPS 220 may utilize a negotiated portion of I/O memory to create a mailbox between the two systems implemented within the aforementioned isolation bridge 210. The hardware may provide, e.g., 8 signals that can be controlled by the hard macro SPS 205 firmware to indicate status as well as to interrupt the PPS 220, where the processor 225 non-volatile IC can mask these sources based on the protocol utilized between the two systems.

For example, a busy signal can be set by the hard macro SPS 205 while processing a smart card application protocol data unit (APDU) that may be status only (masked). Once a command completes, the hard macro SPS 205 can set a done flag that may cause an interrupt (un-masked) to be taken by the processor 225. The definition of the use of these signals can be determined by the hard macro SPS 205 secure firmware and the processor 225 firmware. Similarly, the hardware can provide, e.g., 8 signals, that can be controlled by the PPS 220 firmware to indicate status as well as to interrupt the hard macro SPS 205 (where interrupts are controlled by the hard macro SPS 205 secure firmware).

In addition to the interrupt and I/O memory communication between the two systems, status information may be maintained by the hard macro SPS 205 that can be read by the PPS 220 from the local flash memory, e.g., the local flash memory 105. The PPS 220 provides interface status information to the hard macro SPS 205 as part of the isolated memory buffer. Moreover, the hard macro SPS 205 system status information (such as power state, host port, NFC port, etc) may be retained through power cycles by using the local flash memory as an extension of the buffer provided for NFC EEPROM emulation (as described above). It should be noted, however, that such state information provided here is system-related and may not contain any security sensitive information.

Further still, the PPS 220 may contain its own dedicated timer 265 referenced from a program scan clock (PSCLK) signal with a resolution of 1 MHz (which may be constant regardless of the PSCLK frequency. Moreover, the PPS 220 and the hard macro SPS 205 may have an 8 Kbyte shared memory buffer for mailbox transactions, which may be byte writeable.

As described previously, an eSE, e.g., eSE 200, may utilize a variety of system interfaces to provide external connectivity. Accordingly, and as described above, the PPS 220 may include a slave SPI controller/interface 250 intended for communications with a host device, such as the host device 135. The physical interface between an SPI master (within the host device 135) and the eSE 200 may consist of four SPI signals (SPI_CSB, SPI_CLK, SPI_SI, and SPI_S) and one interrupt signal (SPI_INT). The eSE 200 may be configured to accept active-low or active high polarity on the SPI_CSB chip select signal, and also can be configured to drive an active-low or active-high SPI_INT interrupt signal. The SPI_INT signal can facilitate packet level flow control. Additionally, the bit ordering on the data lines (SPI_SI and SPI_SO) can be configured to be either little-endian or big-endian. Proprietary sleep mode half-duplex handshaking may be implemented between the SPI master and the eSE 200.

The SPI slave interface 250 may include the following: support for SPI Mode 0 (CPOL=0, CPHA=0), where another mode may be set as a default; support for normal SPI bit ordering (MSB first); operation with a range of reference clocks, e.g., up to 24 MHz; and support for interrupt generation when the host device 135 needs to service the SPI slave interface 250.

SPI hardware may share a first in first out (FIFO), which may refer to a set of read/write pointers, storage (e.g., SRAM), and control logic with UART, where access to the FIFO may be conducted through an advanced high-performance bus (AHB) interface, through either direct memory access (DMA) or a central processing unit (CPU). Various SPI modes may be supported, and the host device 135 may decide which SPI mode to use. Upon deciding which SPI mode to use, the host device 135 may notify the eSE 200 of the selection with a negotiation request message at startup. It should be noted that the size of the FIFO may be adjusted in accordance with desired throughput requirements, but as an example, nine-bit addressing may be supported such that any FIFO size up to, e.g., 512B may be chosen.

Another SPI master interface 215 may be implemented locally within the hard macro SPS 205, and may be dedicated to accessing the local flash memory 105. The SPI master interface 215 can support dual data I/O for compatibility with various flash memory vendors. The output may be bi-directional to support dual input, and support for OnSemi, Atmel and Macronix dual data IO may also be included. Multiplexing for the local flash memory 105 may be controlled by hardware in the PPS 220 that selects the PPS 220 by default at reset, and then switches (without glitching) to the SPS 205 when the SPS 205 is activated, as described above.

As alluded to above, the possible host device interfaces 112 (e.g., UART, SPI, and I2C) can be configured as GPIO. The signal pins can be controlled as input, output, I/O, open drain. They can support both level and edge sensitive interrupts. Accordingly, these possible host device interfaces 112 may be effectuated via an I2C interface 245, the SPI slave interface 250, and the UART interface 255, configurable and represented by GPIO/MUX 260, within the PPS 220. Furthermore, the aforementioned DWP/SWP connections may be effectuated via DWP/SWP interface 240.

With regard to the clocking structure of the eSE 200, an internal secure clock domain (which will be described in greater detail below) may be completely isolated and asynchronous from all other external clocks, including clock 270, which may be used for the isolated elements within the PPS 220. Clock 270 of the PPS 220 may be generated based on an optional external clock input or an internal low power oscillator (LPO) dedicated to the PPS 220, where the input clock frequency may be automatically sensed by the eSE 200. A host device interface clock (not shown) can be one of the following frequencies: 26 MHz, 13 MHz, 9.6 MHz, 19.2 MHz, 38.4 MHz, 52 MHz or 16 MHz, and can be either a clock input or a crystal circuited local to the eSE 200.

A power management unit (PMU) 275 may provide power for both the PPS 220 and the hard macro SPS 205. In one example, the PMU 275 may be a 1.8 volt supply powered by the NFC controller 115, and used for field power applications when the host device 135 is not available. The supply voltage (voltage drain) VDD/VDDBAT input can range between 5.5 volts down to 2.4 volts, and may be used for all other modes of operation to power the eSE 200. The PMU 275 may provide step up/down conversion for managing external capacitor 285, where the external capacitor 285 may be used to ensure the completion of writes to external flash memory (e.g., UICC 160) for anti-tearing purposes in all modes of operation of the hard macro SPS 205. It should be noted that anti-tearing capabilities may not be provided in hardware for the PPS 220.

Figure 3:
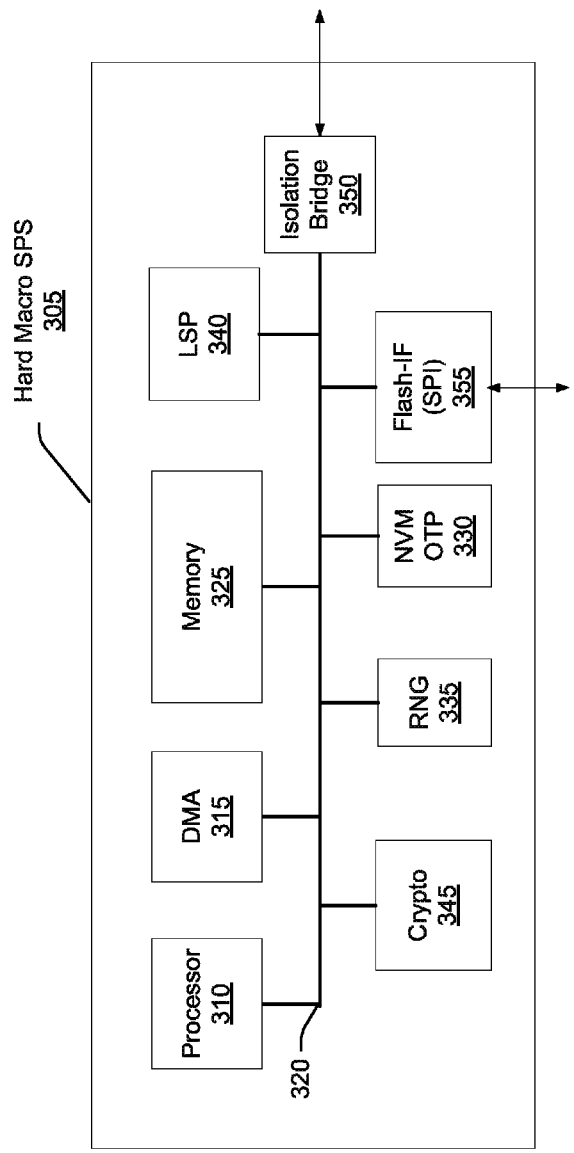
FIG. 3 illustrates a secure processing sub-system configured in accordance with various embodiments.

FIG. 3 illustrates an example representation of a hard macro SPS 305, which may be an embodiment of the hard macro SPS 205 of FIG. 2. The hard macro SPS 305 may be controlled by a processor 310. In accordance with various embodiments, this processor 310 may be a customized implementation of an ARM architecture secure processor core that executes low-level boot code, cryptographic libraries, and security IC embedded software, and may communicate with other elements of the hard macro SPS 305 over encrypted bus (matrix) 320. Also in accordance with various embodiments, the processor 310 may have cached memory to enhance performance, as well as a memory protection unit (MPU) to provide resource partitioning between various software tasks.

A DMA controller 315 may be utilized by the hard macro SPS 305 to accelerate data transfers and act as a hardware partitioned bus master for the encrypted bus 320, where the encrypted bus 320 may provide enhanced protection for the hard macro SPS 305 by having all accesses within the hard macro SPS 305 occur over the encrypted bus 320. It should be noted that the encrypted bus 320 may support encryption of both address and data busses.

Memory 325 of the hard macro SPS 305 may include integrated SRAM, ROM, as well as a hardware memory protection unit (HMPU), and a secure patch mechanism. Data in the SRAM may be stored in an encrypted format, and the HMPU may provide hardware partitioning between masters within memory segments. The ROM may hold IC dedicated support and test software, boot firmware, and any static portions of the aforementioned security IC embedded software. Like the SRAM, data in the ROM may be encrypted. Additionally, the secure patch mechanism may be utilized for the ROM, where all patches can be encrypted and authenticated by secure boot firmware. Upon initialization, the IC dedicated support software (FW.SPS_Boot and FW.SPS_Flash may support loading of a patch image.

Configuration and device-unique information may be handled by NVM-OTP 330. True random number generation (TRNG) and pseudo RNG (PRNG) may be supported by the hard macro SPS 305. A TRNG generator (which may be considered a part of the TOE, i.e., the hard macro SPS 305) may fulfill requirements of the RNG functionality class PTG.2 of the AIS 31. AIS 31 may refer to one method for evaluating physical RNG generators that detect a total entropy source failure and non-tolerable statistical defects of the internal random numbers, along with a stochastic model of the entropy source and statistical tests of the random raw numbers (as opposed to the internal random numbers).

As previously described, an internal secure clock domain within the hard macro SPS 305 may be completely isolated and asynchronous from all other external clocks. A low speed peripheral (LSP) 340 may contain times, security sensors, and clock generation controls for the hard macro SPS 305.

Cryptographic processing engine(s) 345 can allow the hard macro SPS 305 hardware to support accelerators for encryption/cryptographic operations according to the Advanced Encryption Standard (AES), hash-based message authentication code (HMAC), cyclical redundancy checks (CRC), and triple data encryption algorithm (TDES). Secure boot firmware may support a cryptographic library, which will be discussed in greater detail below, and may provide support for additional symmetric cryptographic operations such as, e.g., secure hash algorithm (SHA) 384.

Additionally, the hard macro SPS 305 may implement key generation and asymmetric cryptographic acceleration using a dedicated public key accelerator (PKA) module. Again, the secure boot firmware may support a cryptographic library which in turn provides support for other operations, e.g., elliptic curve (EC) cryptography and encryption based on the Rivest-Shamir-Adleman (RSA) algorithm.

To achieve separation between the hard macro SPS 305 and a PPS, e.g., PPS 220 of FIG. 2, in accordance with various embodiments, an isolation bridge 350, which may be an embodiment of the isolation bridge 210 of FIG. 2, may be utilized. That is, and as indicated above, the isolation bridge 350 may isolate components of the hard macro SPS 305 (i.e., TOE) from external non-secure components, such as the PPS 220. This can ensure the confidentiality and integrity of the TOE (i.e., the hard macro SPS 305) as well as any associated user data by utilizing the isolation bridge 350 as the sole interface for TOE communication. The isolation bridge 350 can prevent secure data from leaking into the PPS 220, and may further ensure that the PPS 220 does not impact the hard macro SPS 305. For example, by isolating the PPS 220 from clocking information in the hard macro SPS 305, an asynchronous TOE boundary may be maintained between the hard macro SPS 305 and the PPS 220, which in turn, can prevent non-secure elements outside of the hard macro SPS 305 from detecting information traveling on buses therein, e.g., the encrypted bus 320.

The isolation bridge 350 may include dedicated memory buffers and mailboxes, as well as a discrete set of GPIO pins controlled by the hard macro SPS 305 to achieve, e.g., complete decoupling from the hard macro SPS 305. For example, the isolation bridge 350 may toggle data pathways to become open and closed, thereby coupling and decoupling elements/components of the hard macro SPS 305 and the PPS 220, e.g., when loading non-secure and/or uncertified data onto a memory unit, transferring data therebetween, etc. Through the isolation bridge 350, the hard macro SPS 305 can accept and respond to ISO 7816 APDU commands.

Local flash memory interface 355 may be utilized (along with the isolation bridge 350) by the hard macro SPS 305 to access non-volatile storage as discussed above, where use of the local flash memory interface 355 and the isolation bridge 350 may be either exclusive or inclusive. The local flash memory interface 355 may be dedicated to enhance performance and availability of non-volatile storage, and may be configured as a hardware access port only, and protected from unauthorized use by the hard macro SPS 305. Furthermore, storage of any data outside of the hard macro SPS 305 may be cryptographically protected to ensure confidentiality and integrity, where the hard macro SPS 305 can detect any modification to data stored in external flash, such as the local flash memory 105.

Hard macro SPS 305 firmware in the ROM may support security IC embedded software. Such low-level firmware may include three primary modules: the secure boot loader (i.e., FW.SPS_Boot for initializing the security IC embedded software and transferring control thereto after completion of the boot process); the cryptographic library (i.e., FW.SPS_Crypto for providing control and access to hard macro SPS 305 cryptographic accelerator hardware blocks and additional cryptographic functionality, as described above); and a secure flash memory driver (FW.SPS_Flash for providing secure read/write/erase capabilities for either the local flash memory, e.g., local flash memory 105 or host device flash memory, e.g., UICC 160, interfaced through the isolation bridge 350). It should be noted that the scope of certification of the hard macro SPS 305 may include RSA signature generation and verification, RSA key generation, elliptic curve Diffie-Hellman (ECDH) key exchange, EC digital signature algorithm (ECDSA) signature generation and verification, EC key pair generation, AES, and DES, secure has computation and CRC computation. The ROM may further include static portions of the security IC embedded software, which can include the middle layer operating system (OS), and although such static portions may reside in the ROM, such static portions need not be considered to be a part of the TOE.

The various diagrams illustrating various embodiments may depict an example architectural or other configuration for the various embodiments, which is done to aid in understanding the features and functionality that can be included in those embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality is presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
 a secure processing sub-system for at least one of storing secure data, storing target of evaluation (TOE) security functions data, and providing a platform on which secure application software is loaded, the secure processing sub-system comprising in part, an isolation bridge and a low speed peripheral module; and
 a peripheral processing sub-system for relaying communications to and from the secure processing sub-system, the peripheral processing sub-system comprising a clock generation module and at least one physical transport interface utilized for the relaying of the communications to and from the secure processing sub-system, wherein the secure processing sub-system is hardware isolated from the peripheral processing sub-system, and wherein the low speed peripheral module includes a secure clock domain that is isolated and asynchronous from a clock domain generated by the clock generation module.

2. The system of claim 1, wherein the isolation bridge communicates with the peripheral processing sub-system while maintaining the hardware isolation of the secure processing sub-system from the peripheral processing sub-system.

3. The system of claim 2, wherein the isolation bridge comprises at least one of general purpose input/output pins, memory buffers, and mailboxes.

4. The system of claim 1, wherein the at least one physical transport interface comprises at least one of an inter-integrated circuit interface (I2C), a serial peripheral interface (SPI), or a universal asynchronous receiver/transmitter (UART) interface.

5. The system of claim 1, wherein the secure processing sub-system utilizes external flash memory comprising a local flash memory dedicated to the secure processing sub-system and accessed via a local peripheral interface on the secure processing sub-system, and a host device flash memory accessed through the peripheral processing sub-system via one of a single wire protocol (SWP) interface and a dual wire protocol (DWP) interface.

6. The system of claim 5, wherein unique keys stored by the secure element protect data stored in the external flash memory.

7. The system of claim 6, wherein the secure processing sub-system comprises a dedicated public key accelerator (PKA) module to generate the unique keys.

8. The system of claim 5, wherein the peripheral processing sub-system has access to the local peripheral interface until the secure processing sub-system is activated.

9. The system of claim 5, wherein the secure processing sub-system retains system status information in the local flash memory, and wherein the peripheral processing sub-system is configured to read the system status information in the local memory.

10. The system of claim 1, further comprising a connectivity device for providing communications capability to a host device, the connectivity device comprising at least a near field communications (NFC) controller, a Bluetooth controller, a wireless local area network (WLAN) controller, a cellular communications controller, and a global positioning satellite (GPS) controller.

11. The system of claim 10, wherein the peripheral processing sub-system mimics the NFC controller for the secure processing sub-system.

12. The system of claim 10, wherein the secure application software supports secure financial transactions involving the host device through at least one of NFC and direct transaction media.

13. The system of claim 10, wherein the peripheral processing sub-system communicates with the connectivity device via a dual wire protocol (DWP) interface.

14. The system of claim 1, wherein the secure processing sub-system further comprises an encrypted bus matrix over which communications within the secure processing sub-system occur.

15. The system of claim 14, wherein the secure processing sub-system further comprises a direct memory access (DMA) controller configured as a bus master for the encrypted bus matrix.

16. The system of claim 14, wherein the isolation bridge maintains an asynchronous TOE boundary between the secure processing sub-system and the peripheral processing sub-system preventing non-secure elements outside of the secure processing sub-system from detecting information traveling on the encrypted bus matrix.

17. The system of claim 1, wherein the secure processing sub-system is configured to communicate with a host device, and wherein the relaying of the communications to and from the secure processing sub-system occurs between the host device and the secure processing sub-system.

18. The system of claim 1, wherein the isolation bridge is configured to maintain the hardware isolation by toggling data pathways between the secure processing sub-system and the peripheral processing sub-system.

19. The system of claim 1, wherein the secure processing sub-system comprises a cryptographic processing engine for accelerating cryptographic operations according to at least one of Advanced Encryption Standard (AES), hash-based message authentication code (HMAC), cyclical redundancy checks (CRC), or triple data encryption algorithm (TDES).

20. A system, comprising:
a secure processing sub-system for at least one of storing secure data, storing target of evaluation (TOE) security functions data, and providing a platform on which secure application software is loaded, wherein the secure processing sub-system comprises an isolation bridge and is configured to:
utilize a local flash memory dedicated to the secure processing sub-system and accessed via a local peripheral interface on the secure processing sub-system, and
utilize a host device flash memory accessed through a peripheral processing sub-system via one of a single wire protocol (SWP) interface or a dual wire protocol (DWP) interface, wherein the secure processing sub-system is hardware isolated from the peripheral processing sub-system; and
the peripheral processing sub-system that relays communications to and from the secure processing sub-system, wherein the peripheral processing sub-system comprises a physical transport interface utilized to relay communications to and from the secure processing sub-system, and is configured to retain access to the local flash memory via the local peripheral interface until the secure processing sub-system is activated.

* * * * *